(12) United States Patent
Sogou

(10) Patent No.: US 10,517,264 B2
(45) Date of Patent: Dec. 31, 2019

(54) ANIMAL LITTER AND METHOD FOR MANUFACTURING SAME

(71) Applicant: UNICHARM CORPORATION, Ehime (JP)

(72) Inventor: Tatsuya Sogou, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 189 days.

(21) Appl. No.: 15/527,700

(22) PCT Filed: Dec. 9, 2014

(86) PCT No.: PCT/JP2014/082550
§ 371 (c)(1),
(2) Date: May 17, 2017

(87) PCT Pub. No.: WO2016/079883
PCT Pub. Date: May 26, 2016

(65) Prior Publication Data
US 2018/0110200 A1   Apr. 26, 2018

(30) Foreign Application Priority Data
Nov. 18, 2014 (JP) ................. 2014-234049

(51) Int. Cl.
A01K 1/015 (2006.01)
(52) U.S. Cl.
CPC .......... A01K 1/0154 (2013.01); A01K 1/0152 (2013.01); A01K 1/0155 (2013.01)

(58) Field of Classification Search
CPC ... A01K 1/0152; A01K 1/0154; A01K 1/0155
See application file for complete search history.

(56) References Cited

U.S. PATENT DOCUMENTS

| 4,407,231 A | 10/1983 | Colborn et al. |
| 5,189,987 A * | 3/1993 | Stanislowski ........ A01K 1/0152 119/171 |
| 5,407,442 A | 4/1995 | Karapasha |

(Continued)

FOREIGN PATENT DOCUMENTS

| CN | 1736177 A | 2/2006 |
| CN | 101810146 A | 8/2010 |

(Continued)

OTHER PUBLICATIONS

Patent Translation of JP 5524405.*

(Continued)

Primary Examiner — Trinh T Nguyen
(74) Attorney, Agent, or Firm — Hauptman Ham, LLP

(57) ABSTRACT

Provided is an animal litter that is capable of sufficiently exerting an effect of perfume-containing microcapsules over a long period of time, and a method for manufacturing the same. The animal litter includes a plurality of grains, wherein each of these grains includes a granular base material and a plurality of microcapsules adhering to the outer surface of the base material, the base material includes a low-absorbent material having an initial absorption rate of 10% or less, and the individual microcapsules are impact-breakable microcapsules including a perfume.

13 Claims, 3 Drawing Sheets

(56) References Cited

U.S. PATENT DOCUMENTS

| | | | |
|---|---|---|---|
| 2002/0014209 A1* | 2/2002 | Bloomer | A01K 1/0154 119/172 |
| 2006/0112893 A1 | 6/2006 | Ikegami et al. | |
| 2009/0044756 A1 | 2/2009 | Otsuji et al. | |
| 2009/0205577 A1* | 8/2009 | Kimmel | A01K 1/0152 119/171 |
| 2009/0260578 A1 | 10/2009 | Yamamoto et al. | |
| 2009/0314215 A1* | 12/2009 | Hurwitz | A01K 1/0152 119/171 |
| 2010/0236128 A1* | 9/2010 | Murray | A01K 87/04 43/24 |
| 2015/0272078 A1* | 10/2015 | Ikegami | B30B 11/228 264/40.1 |
| 2016/0270363 A1 | 9/2016 | Takagi et al. | |

FOREIGN PATENT DOCUMENTS

| | | |
|---|---|---|
| EP | 0076122 A1 | 4/1983 |
| EP | 0691856 A1 | 1/1996 |
| EP | 1466522 A2 | 10/2004 |
| JP | 58-78518 A | 5/1983 |
| JP | 3-76875 A | 4/1991 |
| JP | 2002-84909 A | 3/2002 |
| JP | 2005-290177 A | 10/2005 |
| JP | 5524405 B1 | 6/2014 |
| WO | 94/22501 A1 | 10/1994 |

OTHER PUBLICATIONS

Patent Translation of JP 58-78518.*
International Search Report in PCT Application No. PCT/JP2014/082550, dated Jan. 13, 2015.
Written Opinion in PCT Application No. PCT/JP2014/082550, dated Jan. 13, 2015.

* cited by examiner

ANIMAL LITTER AND METHOD FOR MANUFACTURING SAME

RELATED APPLICATIONS

The present application is a National Phase of International Application Number PCT/JP2014/082550, filed Dec. 9, 2014, which claims priority of Japanese Application No. 2014-234049, filed Nov. 18, 2014.

TECHNICAL FIELD

The present invention relates to animal litter to be used as a spreading material in an animal toilet for a cat, dog or the like, and to a method for manufacturing it.

BACKGROUND ART

In the prior art, toilets for animals such as dogs and cats have been known which have a toilet spreading material (litter) composed of granules with a water absorbing property housed in a resin-formed toilet container. The litter used for such animal toilets is generally formed so as to rapidly absorb liquid excreta such as urine excreted by animals.

Among these there are known types of litter having an aromatic substance adhering to or added to the granules composing the litter, to mask bad odors generated from liquid excreta such as urine by the aromatic effect of the aromatic substance. An example of such litter is proposed in PTL 1, as a spreading material for animals having a large quantity of microcapsules encapsulating an aromatic agent or deodorizing agent, adhering to the outer surfaces of absorbent particles composed of wood or barley husks, or a cellulosic material or clay inorganic material. With the spreading material for animals disclosed in PTL 1, when an animal such as a cat moves or stirs the absorbent particles (so-called scraping sand behavior), the absorbent particles contact each other and the microcapsules adhering to the outer surfaces of the absorbent particles disintegrate, releasing the aromatic agent or deodorizing agent encapsulated in the microcapsules.

CITATION LIST

Patent Literature

[PTL 1] Japanese Unexamined Patent Publication No. 58-078518

SUMMARY OF INVENTION

Technical Problem

However, when the individual granules composing the litter are composed of a granular base material with a high absorption property and microcapsules including an aromatic substance adhering to the outer surfaces of the base material, as with the spreading material for animals disclosed in PTL 1, while the granules have absorbed liquid excreta such as urine, the microcapsules on the base material surfaces have sometimes become incorporated inside the base material together with the liquid excreta such as urine. Granules composed of a base material comprising a highly absorbing material have increased viscosity upon absorbing liquid excreta such as urine, such that the granules tend to adhere together and form clumps, and therefore when liquid excreta such as urine are absorbed by litter having a structure as described above, clumps form by mutual adhesion of the granules, and during the course of formation of the clumps, the microcapsules have sometimes become incorporated into the clumps. When aromatic substance-containing microcapsules thus become incorporated into the base material interiors or within clumps formed by the granules, the microcapsules are less likely to be broken even with the scraping sand behavior of an animal such as a cat after excretion, and even if the microcapsules have broken, the aromatic substance contained in the microcapsules is less likely to be released out of the base material or the clumps, and therefore the aromatic effect or odor-masking effect of the microcapsules cannot be adequately exhibited.

Moreover, when granules having a structure as described above are used as litter, the pet owner must remove the granule clumps formed by absorption of the liquid excreta out of the toilet container using a scoop or the like after the animal has excreted liquid excreta such as urine, and when this is done the litter becomes stirred by the scoop, thereby causing the microcapsules on the base material surfaces to be broken by the impact of the stirring action, and as a result it can potentially become impossible for the aromatic action of the microcapsules to be exhibited for prolonged periods.

It is therefore an object of the present invention to provide an animal litter that can satisfactorily exhibit the effect of aromatic substance-containing microcapsules for prolonged periods, as well as a method for manufacturing it.

Solution to Problem

The animal litter of the present invention is animal litter including granules, each of the granules including a granular base material and microcapsules adhering to the outer surface of the base material, wherein the base material includes a low absorbent material with an initial absorption rate of no greater than 10%, and each of the microcapsules is an impact-disintegrating microcapsule including an aromatic substance.

With the animal litter of the present invention, each of the granules composing the litter have impact-disintegrating microcapsules including an aromatic substance adhering to the outer surface of the base material forming the granules, and the microcapsules disintegrate only by the impact of a load when an animal such as a cat has stepped onto the litter, or by scraping sand behavior, thereby providing a means of control so that the aroma of the aromatic substance is generated only when aroma is needed during the time of excretion, and the aroma of the aromatic substance is not generated at other times when no aroma is needed. Moreover, since the base material forming the granules of the animal litter of the present invention is formed of a material including a low absorbent material with an initial absorption rate of no greater than 10%, even when an animal such as a cat has excreted liquid excreta such as urine, the base material absorbs virtually none of the liquid excreta such as urine, and therefore the microcapsules adhering to the outer surface of the base material are less likely to become incorporated inside the base material together with the liquid excreta such as urine. Furthermore, the granules composed of the base material comprising a material that includes a low absorbent material does not increase in viscosity even when contacting with liquid excreta such as urine, and the granules do not adhere together, such that the microcapsules on the base material surface do not become incorporated inside clumps of the granules. Therefore, the animal litter of the present invention can satisfactorily exhibit the aromatic effect and odor-masking effect of the microcapsules including the aromatic substance.

Moreover, since the animal litter of the present invention also fails to form clumps by adhesion between the granules even when an animal such as a cat has excreted liquid excreta such as urine, the owner does not need to remove the clumps from the toilet container using a scoop, and unwanted breaking of the microcapsules can be prevented. As a result, it is possible to exhibit the effect of the aromatic substance-containing microcapsules for prolonged periods.

Advantageous Effects of Invention

According to the present invention it is possible to provide an animal litter that can satisfactorily exhibit the effect of aromatic substance-containing microcapsules for prolonged periods.

DESCRIPTION OF EMBODIMENTS

Preferred embodiments of the animal litter of the present invention will now be described in detail with reference to the accompanying drawings.

Figure 1:
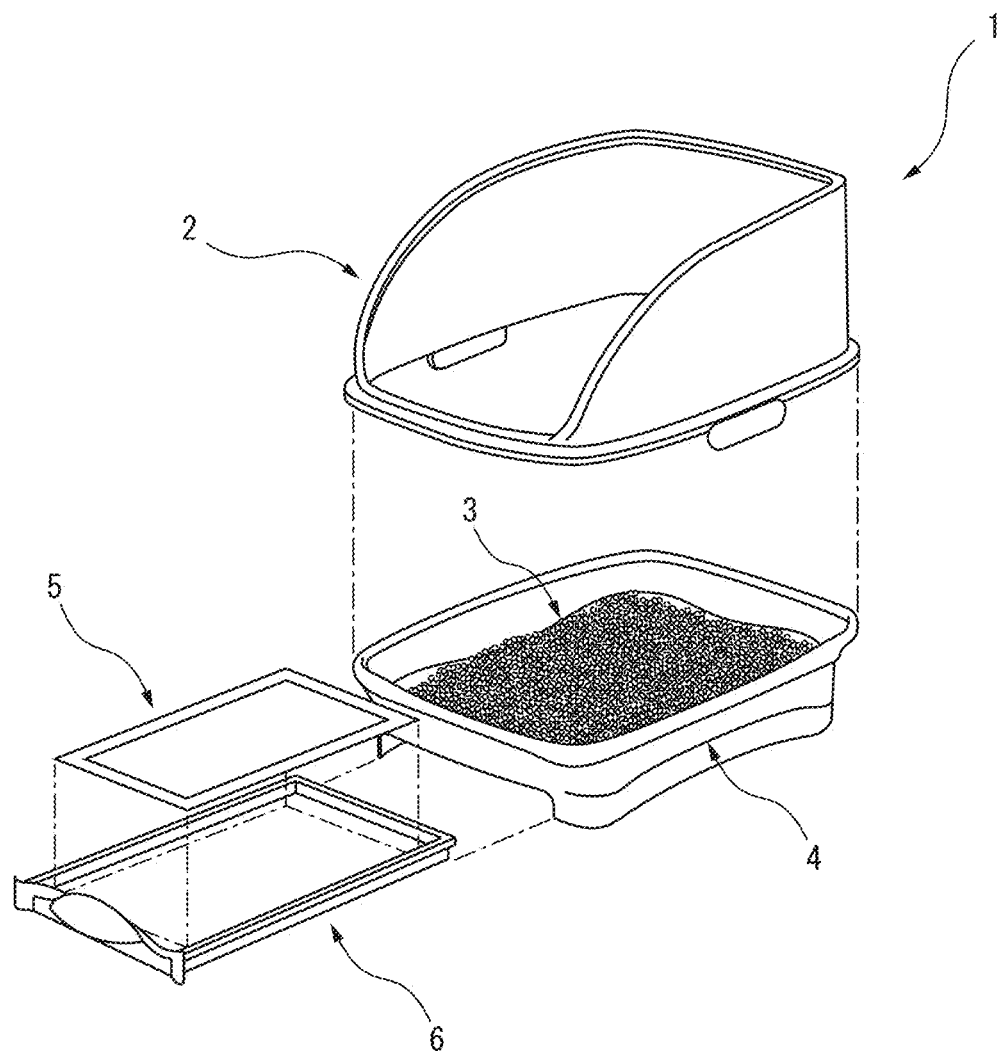
FIG. 1 is a perspective view of the construction of an animal toilet employing litter as an embodiment of the present invention.

FIG. 1 is a perspective view of the construction of an animal toilet employing litter as an embodiment of the present invention. As shown in FIG. 1, the animal toilet 1 comprises a cover 2 that limits the entranceway for the animal such as a cat and prevents excreta and litter 3 from flying out as described below, litter 3 composed of a granular base material including a low absorbent material and microcapsules including an aromatic substance, a litter housing container 4 as a container for housing of the litter 3, comprising a bottom section (for example, a duckboard) having a structure allowing passage of liquid excreta such as urine (for example, a porous structure or mesh structure), an excreta treatment sheet 5, below the bottom section, to absorb and hold liquid excreta such as urine that has passed through the litter 3 and bottom section, and an excreta treatment sheet-housing container 6 as a container for housing the excreta treatment sheet 5, embedded in a freely removable manner under the litter housing container 4.

The animal toilet 1 is constructed so that liquid excreta such as urine that has been excreted from an animal such as a cat passes through litter 3 essentially without being absorbed by the litter 3, and is absorbed and held in an excreta treatment sheet 5 situated below the litter 3, and therefore even when bad odor has been generated from liquid excreta held in the excreta treatment sheet 5 after excretion by the animal, it is possible to minimize diffusion of the bad odor by the aromatic effect or odor-masking effect of the microcapsules including the aromatic substance in the litter 3 that is situated above the excreta treatment sheet 5. Furthermore, since the litter 3 in the animal toilet 1 does not absorb liquid excreta such as urine and form clumps, it is possible to reduce the frequency of litter exchange compared to litter composed of conventional absorbent particles, and to reduce the likelihood of adhesion of liquid excreta such as urine to the feet of the animal such as a cat even after scraping sand behavior following excretion by the animal. In addition, since the animal toilet 1 is designed so that the bottom section on which the litter 3 is spread and the excreta treatment sheet 5 are disposed separately from each other, even when an animal such as a cat steps onto the litter 3 after excretion, the excreta treatment sheet 5 is not exposed to the load of the body weight of the animal, providing the advantage of reduced likelihood of rewetting by the liquid excreta such as urine that has been absorbed in the excreta treatment sheet 5.

Figure 2:
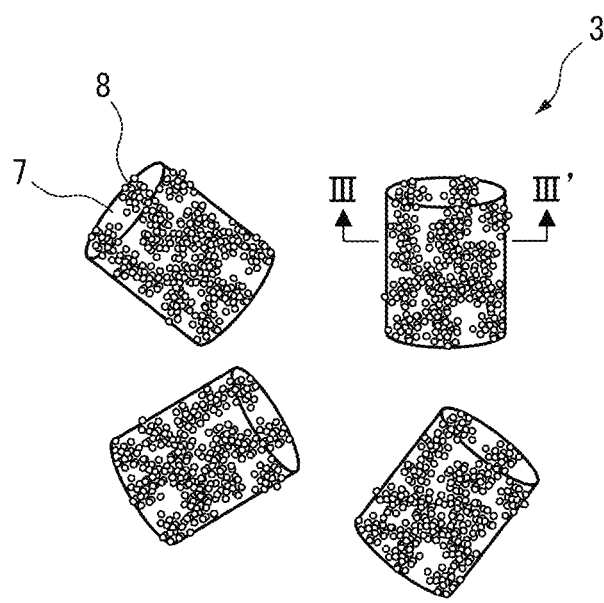
FIG. 2 is a schematic view of litter according to an embodiment of the present invention.

FIG. 2 is a schematic view of litter according to an embodiment of the present invention. As shown in FIG. 2, the litter 3 of this embodiment is composed of granules, each of the granules including a granular base material 7 comprising a low absorbent material with an initial absorption rate of no greater than 10%, and impact-disintegrating microcapsules 8 adhering to the outer surfaces of the base material 7.

For this embodiment, the base material 7 is a granular base material including a low absorbent material, having an initial absorption rate of no greater than 10%. The initial absorption rate referred to here is the percentage reduction (%) of artificial urine obtained by the following measuring method.

[Measurement of Initial Absorption Rate]

(1) Using a cylindrical container (diameter: 10 cm, depth: 2 cm) comprising at the bottom section a duckboard with 2.75 mm×23.5 mm rectangular openings and a 2 mm-wide ribs, and having an open area ratio of 25%, the granules (litter granules) are spread onto the duckboard to a thickness of 2 cm.

(2) A dropping tool having a tip section with an inner diameter of 2.47 mm and an outer diameter of 5.47 mm is used to drop 20 g of artificial urine onto the litter for 10 seconds, from a position 3 cm above the surface of the spread litter.

The artificial urine is prepared by dissolving 200 g of urea, 80 g of sodium chloride, 8 g of magnesium sulfate, 3 g of calcium chloride and approximately 1 g of dye: Blue #1 in 10 L of ion-exchanged water.

(3) The artificial urine that has passed through the litter and duckboard is collected and its weight W (g) is measured.

(4) The weight W (g) of the artificial urine after collection is subtracted from the weight 20 g of the artificial urine used, the artificial urine reduction $\Delta W$ (g) is calculated, and the value of the reduction $\Delta W$ is used to obtain the artificial urine percentage reduction $R_d$ (%) (=reduction $\Delta W$ (g)/20 (g)×100). The artificial urine percentage reduction Rd is recorded as the initial absorption rate (%).

According to the present invention, the low absorbent material used in the raw material of the base material used to form the base material has an initial absorption rate of no greater than 10%, and the lower limit, while not particularly restricted, is preferably 3% or greater. If the initial absorption rate is 3% or greater, the granules (litter) will be able to absorb liquid excreta that has pooled between the litter granules and at the bottom section (duckboard) of the litter housing container after the liquid excreta such as urine has passed through the litter, so that bad odor and bacterial proliferation from the pooled excreta can be minimized, and the hygienic state of the animal toilet using the litter can be satisfactorily maintained. If the initial absorption rate is no greater than 10%, it will be possible to increase the liquid permeability of the granules (litter) for liquid excreta and thus to reduce the amount of pooled excreta, so that bad odor and bacterial proliferation from the pooled excreta can be reduced, and the hygienic state of the animal toilet using the litter can be satisfactorily maintained as a result.

According to the present invention, the low absorbent material is not particularly restricted so long as the initial absorption rate is no greater than 10%, and for example, an inorganic material such as a zeolite-based material composed mainly of zeolite or a silica-based material composed mainly of silica or modified silica may be used. Of these, zeolite-based materials are particularly preferred for use from the viewpoint of adsorption properties (deodorant function) and excellent softness as a spreading material.

A zeolite-based material is a material including at least 50 mass % of zeolite as the main component, and it preferably includes 50 to 95 mass % zeolite, more preferably 70 to 90 mass % zeolite and most preferably 75 to 85 mass % zeolite. If the zeolite content is at least 50 mass %, it will be possible to impart an adsorption property (deodorant function) to the base material itself, and to more effectively minimize generation of bad odors. Also, if the zeolite content is 95 mass % or lower, it will be possible to improve the strength of the base material itself and to stably maintain the base material form.

According to the present invention, the low absorbent material may include, in addition to the zeolite-based material, a solidifying material composed of a cement-based material, a non-cement-based material or a combination thereof, as an inorganic binder. A base material including such a solidifying material hardens by hydration of the solidifying material with water (urine), resulting in cracking when dried, and it can therefore hold microcapsules in the cracks. The microcapsules held in such cracks are more difficult to break than microcapsules adhering to a flat base material surface, and it is thus possible to effectively prevent unnecessary breaking of the microcapsules by impacts when it is conveyed during the production process or during transport of the litter product. Moreover, the base material including the solidifying material is less able to absorb water (urine) by the solidifying material that has been hardened by hydration with the water (urine) and does not swell or expand even after it has absorbed a slight amount, and therefore granules (litter) composed of a base material including such a solidifying material can maintain, for long periods of time, liquid permeability for liquid excreta such as urine that has been excreted onto the litter.

A cement-based material is a material composed mainly of calcium silicate, having the property of hardening by hydration with water. Examples of cement-based materials include Portland cement and white cement. Also, when low alkaline cement is used as a cement-based material, the pH of the granules can be lowered to reduce ammonia generated from the liquid excreta such as urine and to more effectively prevent generation of bad odors.

A non-cement-based material is a material having the property of hardening by hydration with water, that is a material other than cement, i.e. a material containing no calcium silicate as a major component. Examples of such non-cement-based materials include dolomite, calcium oxide, calcium sulfate (for example, gypsum), magnesium oxide, and a combination thereof. Moreover, when a material composed mainly of calcium sulfate or magnesium oxide is used as a non-cement-based material, the hydroxide produced by hydration with water (urine) that exhibits weak alkalinity can lower the pH of the granules, thereby allowing ammonia generated from the liquid excreta such as urine to be reduced, and allowing generation of bad odors to be more effectively prevented.

The content of the solidifying material in the low absorbent material will usually be 5 to 30 mass % and is preferably 10 to 20 mass %. If the solidifying material content is 5 mass % or greater it will be possible to ensure sufficient strength as granules, and if the solidifying material content is 30 mass % or lower, then the bad odor inhibiting effect of the granules can be more effectively exhibited.

According to the present invention, the low absorbent material may include, in addition to the inorganic material and solidifying material, optional components such as a hardening-accelerating component or a thickening component (for example, a cellulosic material), an adsorbing deodorant component (for example, a porous material comprising a metal oxide such as silica gel), in prescribed ranges (for example, up to 0.5 mass % for a thickening component or up to 10 mass % for an adsorbing deodorant component).

Also, the base material used for the present invention may be one comprising granular clumps composed of a mixture of the inorganic material and an optional solidifying material, coated with a non-water-absorbing or water-repellent coating agent. Treatment with the coating agent can be accomplished easily by spray coating a coating agent on the surfaces of the granular clumps. The coating agent used is not particularly restricted, and it may be a waxy resin such as paraffin wax, a silicon-based resin, a fluorine-based resin or the like, which are publicly known in the prior art. The coverage of the coating agent may be, for example, 0.01 to 5 mass %, preferably 0.05 to 1 mass % and more preferably 0.1 to 0.5 mass %, with respect to the mass of the granular base material.

According to the present invention, the raw material for the base material is not limited to an inorganic material such as a zeolite-based material, and for example, it may be a water-absorbing material such as pulp or wood waste that has been hardened into granules with a resin adhesive, or granular clumps made of the above water-absorbing material that have been coated with the aforementioned non-water-absorbing or water-repellency coating agent, so long as the initial absorption rate is no greater than 10%.

Since the base material formed by the raw material for the base material that includes a low absorbent material has a slow absorption rate and a low absorption factor (but not zero) for water (urine), the granules (litter) formed using the base material absorb almost no liquid excreta such as urine excreted from an animal such as a cat, or even if they absorb it, the amount is minimal, and it can be caused to rapidly migrate downward by the action of gravity. Since litter of this type has a slow absorption rate for water (urine), liquid excreta such as urine is not absorbed to saturation when the liquid excreta passes through the litter. Furthermore, litter including such a low absorbent material has an absorption property, though minimal, and it is able to absorb liquid excreta that has pooled between the litter granules and at the bottom section (duckboard) of the litter housing container after the liquid excreta such as urine has passed through the litter, so that bad odor and bacterial proliferation from the pooled excreta can be minimized, and the hygienic state of the animal toilet using the litter can be satisfactorily maintained.

According to the present invention, there are no particular restrictions on the shape of the base material (i.e., the shapes of the granules), and shapes such as spherical or cylindrical shapes may be employed, although cylindrical shapes are preferred from the viewpoint of reducing fly off of the litter and allowing easier stepping of the animal during use. A base material with the prescribed shapes can be obtained, for example, by granulation using a compression molding apparatus, such as a disc pelleter, briquet machine, tableting machine or the like. Of these, granulation is preferably performed using a disc pelleter or briquet machine from the viewpoint of allowing continuous mass production of the granules.

According to the present invention, the particle size of the base material (granules) is not particularly restricted, but from the viewpoint of reducing fly off of the litter and allowing easier stepping of the animal during use, it may be in the range of, for example, 2 to 25 mm, preferably 3 mm to 20 mm and more preferably 5 to 15 mm. When the shape of the base material is spherical, and the diameters of one grain in the spherical base material are not homogeneous, the particle size is defined as the maximum diameter of the spherical base material. When the shape of the base material is cylindrical, considered from the viewpoint of reducing fly off of the litter and allowing easier stepping of the animal during use, the particle size of the base material (the cylindrical bottom surface diameter) may be, for example, in the range of 2 to 10 mm and preferably in the range of 3 to 8 mm, and the particle length of the base material (the cylindrical height) may be, for example, in the range of 3 to 25 mm and preferably in the range of 5 to 20 mm. The particle size of the base material is obtained by measuring the particle sizes of 20 grains and taking the average value as the particle size. The grain length of the base material is obtained by measuring the grain lengths of 50 grains and taking the average value as the grain length.

The microcapsules 8 of this embodiment will now be described.

The microcapsules 8 are impact-disintegrating microcapsules including an aromatic substance. More specifically, the microcapsules 8 are composed of outer shells of prescribed strength that disintegrate by the load applied when an animal such as a cat steps onto the litter, or by the impact of scraping sand behavior of the animal, and an aromatic substance held inside the outer shells. According to the present invention, the material composing the outer shells of the microcapsules may be any material having a prescribed strength so that they disintegrate by the load applied when the animal steps onto the litter or by impact of scraping sand behavior by the animal, without any particular restrictions, and for example, a melamine resin, polyurethane resin, polyurea resin, polyester resin, gelatin, polystyrene resin, polycarbonate resin, urea-formaldehyde resin or the like may be used. Such resins may be used alone, or two or more resins may be used in combination.

Of these, melamine resins are particularly preferred for use since they do not break by friction produced during transport of the litter product or by light impacts, and allow precision formation of outer shells having appropriate strength such that they only break under the load applied when an animal such as a cat has stepped on the litter or the impact of scraping sand behavior of an animal. In addition, melamine resins are also preferred materials from the standpoint of easier formation of microcapsules with small particle sizes (≤10 µm), as explained below.

According to the present invention, the aromatic substance held inside the microcapsules (inside the outer shells) is not particularly restricted, and any desired aromatic substance may be used corresponding to the desired aroma. Examples of such aromatic substances include alcohols such as geraniol, citronellol, citral, eugenol, phenethyl alcohol, thymol, linalool, leaf alcohol, menthol and benzyl alcohol, esters such as dicyclopentadiene propionate and hexyl acetate, aldehydes such as hexylcinnamaldehyde, and ketones such as methylionone, β-ionone and δ-damascone, any of which compounds may be used alone or in combinations of two or more.

According to the present invention, the particle size of the microcapsules is not particularly restricted and a particle size in the range of 0.5 to 20 µm, for example, may be employed, but it is preferably in the range of 1 to 10 µm. If the particle size of the microcapsules is within this range, the multiple microcapsules will easily adhere to the base material surface, and since microcapsules with such a small particle size have greater intermolecular force with the base material, they can firmly adhere to the base material surface without using an adhesive. As a result, it is possible to more reliably exhibit the aromatic effect of the aromatic substance-containing microcapsules for more prolonged periods. When an adhesive is used to adhere the microcapsules onto the base material surface, the adhesive becomes coated in a manner covering the microcapsules, making it difficult for the microcapsules to break and interfering with external release of the aromatic substance held inside the microcapsules. The particle size of the microcapsule, incidentally, is the particle size of at least 90% of the total number of particles. The particle size of the microcapsules can be measured using a laser diffraction particle size distribution analyzer (MasterSizer 3000 by Malvern Instruments Ltd.) or a similar device.

The method for manufacturing the microcapsules according to the present invention is not particularly restricted so long as the aromatic substance can be held inside the outer shells of the microcapsules, and any production method known in the prior art may be employed, but it is preferred to use a suspension polymerization method from the viewpoint of obtaining microcapsules with a small particle size while simultaneously preparing a suspension (microcapsule-containing suspension) with the specified viscosity (200 to 2200 mPa·s). The microcapsules can be produced by the following procedure, for example.

(i) In a reactor equipped with a stirrer, the aromatic substance is dispersed in water and stirred under optional temperature conditions (for example, a temperature in the range of 60 to 90° C.), to prepare an aromatic substance dispersion with the aromatic substance dispersed with the desired particle size. The concentration of the aromatic substance in the aromatic substance dispersion is not particularly restricted but may be in the range of 0.1 to 30 mass %, for example.

(ii) In a different reactor from the aromatic substance dispersion, monomer components (for example, melamine and formaldehyde) are added to water, and polycondensation is conducted at an optional temperature under neutral or alkaline conditions, to prepare a water-soluble prepolymer. The reaction time for preparation of the prepolymer may be 5 to 30 minutes, for example. When melamine and formaldehyde are used as the monomer components, their mixing ratio (molar ratio) is melamine:formaldehyde=1:2 to 1:6, and the concentration at the time each is added is in the range of 1 to 30 mass %.

(iii) The prepolymer, a dispersing agent comprising a surfactant, and an optional stabilizer are added to the aromatic substance dispersion, and then an acid such as citric acid, sulfuric acid or hydrochloric acid is used to adjust the pH of the liquid mixture to the range of 2 to 6, after which polycondensation of the prepolymer is further carried out under optional temperature conditions (for example, 60 to 90° C.), to obtain microcapsules having a structure holding the aromatic substance inside an outer shell of the polymer component. The microcapsules are obtained as a dispersion in water, the dispersion including the microcapsules at 0.1 to 20 mass % and the dispersing agent at 0.01 to 10 mass %, for example. The reaction time for polycondensation of the prepolymer is 2 to 8 hours, for example.

According to the present invention, the means for adhering the aromatic substance-including microcapsules onto the granular base material is not particularly restricted, and for example, if the powdered microcapsules are blasted onto the granular base material particles directly in powder form, or in the form of a dispersion in a dispersing medium such as water, it is possible to adhere multiple microcapsules onto the base material. The multiple microcapsules may be adhered onto the entire base material surface; however, as explained below, they are preferably adhered so as to be only partially present on the base material surface. Here, the phrase "partially present on the surface" means that they are not present over the entire surface, and specifically, it means that they are present in a range for an area ratio of no greater than 99% (for example, an area ratio of 70% or an area ratio of 30%) with respect to the total surface area of the base material surface. According to the present invention, the aspect in which multiple microcapsules are partially present on the base material surface is not particularly restricted, and it may be an aspect with multiple microcapsules present as non-uniform mottle, or an aspect with multiple microcapsules present only at one or more prescribed regions, or an aspect with multiple microcapsules absent only at one or more prescribed regions.

Figure 3:
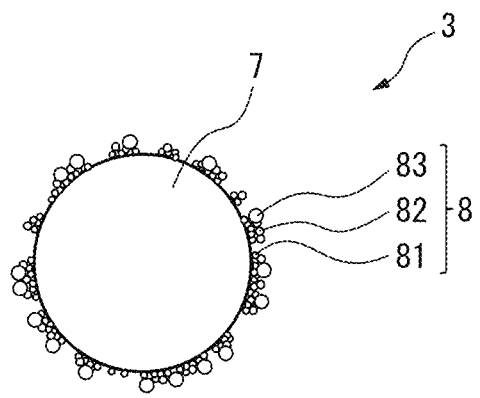
FIG. 3 is a schematic cross-sectional view of litter according to an embodiment of the present invention, along line III-III' in FIG. 2.

FIG. 2 is a schematic view of litter according to an embodiment of the present invention, and FIG. 3 is a schematic cross-sectional view of litter according to an embodiment of the present invention, along line III-III' in FIG. 2. As shown in FIG. 2 and FIG. 3, the multiple microcapsules 8 of this embodiment are partially present on the surface of the granular base material 7. The microcapsules of the present invention are hydrophobic, and therefore when the hydrophobic microcapsules are partially present on the base material surface (i.e., when the base material surface includes regions where the hydrophobic microcapsules are not present), the granules can absorb liquid excreta such as urine, though in small amounts, at the regions where the microcapsules are not present. As a result, even when liquid excreta such as urine that has been excreted from an animal such as a cat has pooled between the litter granules or on the bottom section (duckboard) of the litter housing container, the liquid excreta such as urine that has pooled can be absorbed at the regions of the granules where the microcapsules are not present, so that it is possible to absorb liquid excreta that has pooled between the litter granules and at the bottom section (duckboard) of the litter housing container after the liquid excreta such as urine has passed through the litter, allowing bad odor and bacterial proliferation from the pooled excreta to be minimized, and allowing the hygienic state of the animal toilet using the litter to be satisfactorily maintained. This allows the hygienic state of the animal toilet to be satisfactorily maintained.

According to the present invention, the means for partially adhering the aromatic substance-including microcapsules onto the base material surface is not particularly restricted, and for example, it may be means wherein a dispersion is prepared with the aromatic substance-including microcapsules dispersed in a dispersing medium such as water at a concentration of 0.5 to 5 mass %, the dispersion having a viscosity of 200 to 2200 mPa·s, and the dispersion is blasted onto multiple grains of the granular base material using coating means such as a spray nozzle. The blasting volume for blasting of the dispersion onto the granular base material may be 0.1 to 10 g with respect to 1 L of the granular base material.

When a dispersion having such a specified viscosity of 200 to 2200 mPa·s is blasted onto a granular base material, droplets of the dispersion adhere (i.e., partially adhere) onto multiple locations on the base material surface as aggregates, but because the dispersion droplets have a low flow property and tend to reside at their adhered locations by surface tension, the multiple microcapsules present in the droplets adhere onto the base material surface at the locations of the base material surface where the dispersion droplets have adhered, creating a situation in which the multiple microcapsules are partially present on the base material surface. When a low-viscosity dispersion (with a viscosity of less than 200 mPa·s) is used as the microcapsule-containing dispersion, however, the dispersion is blasted onto the base material and becomes diffused in an atomized state by the high flow property of the dispersion, resulting in adhesion of the dispersion over a wide region of the base material surface, and causing the dispersion that has adhered onto the base material surface to become even more greatly diffused onto the base material surface by the high flow property thereof, and therefore the multiple microcapsules present in the dispersion are less likely to adhere partially onto the base material surface.

A dispersion having such a specified viscosity can be prepared by dispersing the powdered microcapsules in a dispersing medium such as water using a dispersing agent such as a surfactant; however, from the viewpoint of simplifying the production steps, it is preferred to use the polymerized suspension obtained when the microcapsules are produced, either directly as a suspension or after adjustment of the viscosity by varying the water content. The dispersion viscosity can be measured using an RVT-type viscometer (23° C., 50 rpm) by Brookfield, for example.

Also, as shown in FIG. 3, at least some of the multiple microcapsules 8 for this embodiment are accumulated on the surface of the base material 7 so that layers composed of the microcapsules are overlapping. When microcapsule layers are thus accumulated on the base material surface so that they have overlapping layers, even when the microcapsules on the outermost layer among the overlapping layers of the microcapsules have been broken by a load applied when an animal such as a cat has stepped onto the litter or by the impact of scraping sand behavior by the animal, a separate layer of microcapsules will be present under the broken microcapsules, and therefore when the animal again steps onto the litter or performs scraping sand behavior, the microcapsules of the separate microcapsule layer will break, allowing the aromatic substance held in those microcapsules to be released. Consequently, the aromatic effect and odor-masking effect of the microcapsules including the aromatic substance can be exhibited for prolonged periods.

According to the present invention, the means for accumulating the aromatic substance-including microcapsules onto the base material surface in such a manner as to obtain overlapping layers of the microcapsules is not particularly restricted, and for example, it may be means in which a sufficient quantity of the microcapsules is adhered onto the granular base material, but the means used is preferably means wherein a dispersion is prepared with the aromatic substance-including microcapsules dispersed in a dispersing medium such as water at a concentration of 0.5 to 5 mass %, the dispersion having a viscosity of 200 to 2200 mPa·s, and the dispersion is blasted onto multiple grains of the granular base material using coating means such as a spray nozzle. In this case as well, the blasting volume for blasting of the dispersion onto the granular base material may be 0.1 to 10 g with respect to 1 L of the granular base material. When a dispersion with a specified viscosity of 200 to 2200 mPa·s is thus blasted onto the granular base material, the dispersion droplets adhere onto multiple locations of the base material surface as multiple aggregates and pool at the adhered locations as explained above, but as the adhered droplets dry, they gradually shrink and result in accumulation of the multiple microcapsules present in the droplets, whereby the multiple microcapsules are left partially present on the base material surface and accumulate on the base material surface in the form of multiple layers composed of the microcapsules.

Furthermore, as shown in FIG. 3, the multiple microcapsules of this embodiment include different types of microcapsules with different particle sizes (small particle size capsules 81 with particle sizes of 1 to 4 µm, medium particle size capsules 82 with particle sizes of 5 to 7 µm, and large particle size capsules 83 with particle sizes of 8 to 10 µm). When the multiple microcapsules include different types of microcapsules with different particle sizes, the microcapsules with large particle sizes tend to adhere over the microcapsules with small particle sizes when the multiple microcapsules are adhering onto the base material surface (or in other words, the microcapsules with small particle sizes readily enter the gaps under the microcapsules with larger particle sizes), and therefore the multiple microcapsules can more reliably accumulate on the base material surface so as to result in overlapping layers composed of the microcapsules. This can more reliably exhibit an effect whereby the aromatic effect and odor-masking effect of the microcapsules including the aromatic substance can be exhibited for prolonged periods.

According to the present invention, the different types of microcapsules with different particle sizes are such that the proportion of microcapsules with particle sizes of 1 to 10 µm is at least 90% of the total number of microcapsules, and preferably small particle size capsules with particle sizes of 1 to 4 µm constitute 20 to 50% and large particle size capsules with particle sizes of 8 to 10 µm constitute 3 to 30% of the total, while medium particle size capsules with particle sizes of 5 to 7 µm preferably constitute 20 to 77% of the total number of microcapsules. If the multiple microcapsules are composed of particle size groups in such specific proportions, then the small particle size capsules will readily enter into the gaps between the large particle size capsules when the multiple microcapsules are adhered onto the base material surface, and therefore the multiple microcapsules can more reliably and more precisely accumulate on the base material surface in a manner such that multiple layers of the microcapsules are overlapping. This can more reliably and more effectively exhibit an effect whereby the aromatic effect and odor-masking effect of the microcapsules including the aromatic substance can be exhibited for prolonged periods. The particle size distribution of the microcapsules can be measured using a laser diffraction particle size distribution analyzer (MasterSizer 3000 by Malvern Instruments Ltd.) or a similar device.

A method of producing litter according to the present invention will now be explained as an example.

The method for manufacturing litter of the present invention has a granulation step in which multiple grains of a granular base material are granulated from a raw material for the base material that includes at least a low absorbent material with an initial absorption rate of no greater than 10%, a conveying step in which the granulated base material grains are conveyed to a storage tank, and a packaging step in which the granular base material grains that have been conveyed to the storage tank are packaged into fixed quantities, and the packaging step further includes blasting of the multiple microcapsules onto the granular base material grains.

The granulation step can be carried out in the following manner. First, a raw material for the base material including the low absorbent material, and if necessary a solidifying material, thickening component and the like, is mixed with each in their prescribed mixing proportions, and after further adding water, an optional mixer or the like is used for stirring and mixing to uniformity. Next, the mixture obtained by stirring and mixing is granulated using a compression molding apparatus such as a disc pelleter, briquet machine or tableting machine, for example, to obtain granular base material grains having the prescribed shapes and prescribed sizes. The stirring, mixing and granulation may be carried out in separate apparatuses or in the same apparatus.

The granular base material obtained in this manner is subjected to a step of stationing for a prescribed time period (curing step) to promote hardening of the solidifying material. The stationing time in the curing step will differ depending on the atmospheric temperature, but it is preferably carried out for 72 hours or longer from the viewpoint of sufficiently hardening the solidifying material. When a solidifying material has not been added to the raw material for the base material, there is no need for such a curing step.

The granular base material is then dried with a dryer. The drying may be carried out using any desired dryer, such as a rotary kiln dryer, for example. The drying is also preferably carried out so that the moisture content of the base material is no greater than a prescribed level (for example, 10%). The moisture content of the base material can be calculated by redrying the dried base material at 110° C. for 24 hours, and then calculating the difference in the base material mass before and after the redrying as the water content (g) of the base material, and dividing the water content by the base material mass (g) before redrying.

The granular base material obtained after drying may be sieved to remove the large and small base material grains, to obtain granular base material grains with the prescribed size.

The obtained granular base material grains are then passed through a conveying step in which they are conveyed to a storage tank and a packaging step in which the granular base material grains conveyed to the storage tank are packaged into fixed quantities, as the final animal litter product, the packaging step including a step of transferring the granular base material grains from the storage tank into packaging bags by dropping, while using a coating apparatus such as a spray nozzle to blast the aromatic substance-including microcapsules onto the granular base material grains. When the multiple microcapsules are thus blasted, the multiple microcapsules readily adhere in a partial manner onto the surface of the granular base material, and the granular base material (granules) onto which the multiple microcapsules have adhered remain housed in the packaging bag without being stirred, so that it is easy to maintain the state of the multiple microcapsules being partially adhered onto the base material surface. In addition, adhesion of the aromatic substance-including microcapsules in the packaging step makes it possible to prevent unnecessary breaking of the multiple microcapsules by impact when they are conveyed during the production process. As a result, the aromatic effect and odor-masking effect of the microcapsules including the aromatic substance can be exhibited adequately and for prolonged periods.

The litter of the present invention is to be used for an animal toilet according to the embodiment described above (specifically, the aspect illustrated in FIG. 1); however, instead of an animal toilet of this type, it may be applied to animal toilets of various different types that employ litter, such as types without a cover, or types having litter directly spread onto an excreta treatment sheet, or types wherein litter composed of a super-absorbent material is mixed and spread in a granule-housing container. Furthermore, the litter of the present invention is not restricted to the embodiments described above and can incorporate appropriate combinations and modifications within a range that is not outside of the object and gist of the present invention.

EXAMPLES

The present invention will now be explained in greater detail using examples and comparative examples, with the understanding that the present invention is not limited only to these examples.

Example 1

After mixing 69.8 mass % of zeolite powder (from Ayashi, Miyagi Prefecture, passing 60 mesh, mean particle size: 150 μm, moisture content: ≤7%) as a low absorbent material with an initial absorption rate of no greater than 10%, 20 mass % of white cement (product of Taiheiyo Cement Corp.) as a solidifying material, 10 mass % of C-type silica gel (from Qingdao, China) as an adsorbing deodorant component and 0.2 mass % of modified cellulose as a thickening component, and further adding 50 mass % water, the components were stirred and mixed with a Loedige mixer. The mixture obtained by stirring was subjected to compressive granulation with a disc pelleter (product of Dalton Co., Ltd., disc exit opening dimensions: 5.5 mm diameter, 35 mm disc thickness, 12 mm effective length), to obtain numerous essentially cylindrical base material grains. The essentially cylindrical base material had a mean particle size (cylindrical bottom surface diameter) of 5.5 mm and a mean particle length (cylindrical height) of 25 mm, and had an initial absorption rate of 9%.

Next, the numerous essentially cylindrical base material grains were stationed at room temperature (20° C.) for 72 hours to promote curing reaction of the white cement (solidifying material), after which the base material was dried to a final moisture content of no greater than 10% using a rotary kiln dryer. The essentially cylindrical base material grains obtained after drying had a mean particle diameter of 5.5 mm and a mean particle length of 9 mm.

A commercially available dispersion (microcapsule concentration: 0.5 mass %), comprising impact-disintegrating microcapsules including an outer shell made of a melamine resin and an aromatic substance held inside the outer shell, and with a particle size of 4 μm, which were dispersed in water, was blasted onto the aforementioned essentially cylindrical base material grains using a spray nozzle, to obtain granules with aromatic substance-including microcapsules adhering to the outer surface of the base material. The blasting volume for blasting of the dispersion onto the essentially cylindrical base material grains was 1 g with respect to 1 L of the base material.

[Electron Microscope Observation of Granule Surface]

Figure 4:
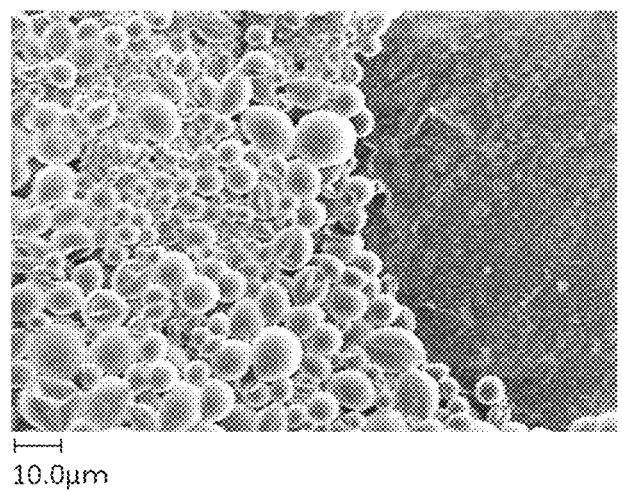
FIG. 4 is an electron micrograph of a granule of Example 1 of the present invention.

The surface of a single granule obtained in Example 1 was observed with a scanning electron microscope, and the state of adhesion of the microcapsules on the granule surface was confirmed. FIG. 4 is an electron micrograph of a granule in Example 1. As seen in this electron micrograph, it was confirmed that the granule of Example 1 has a region where the microcapsules are not present on the base material surface (approximately ⅓ of the electron micrograph, at the right side in FIG. 4), while different types of microcapsules with different particle sizes are partially present on the base material surface, and multiple microcapsules are accumulated in a manner such that a layer composed of medium particle size capsules and a layer composed of large particle size capsules are overlapping on a layer composed of small particle size capsules.

Example 2

Granules having aromatic substance-including microcapsules adhered to the outer surface of the base material were obtained in the same manner as Example 1, except that microcapsules with a gelatin outer shell were used instead of microcapsules with a melamine resin outer shell.

Comparative Example 1

Granules having aromatic substance-including microcapsules adhered to the outer surface of the base material were obtained in the same manner as Example 1, except that the super-absorbent material bentonite (product of Nihon Kouken Co., Ltd.) was used instead of zeolite powder as the raw material for the base material.

Comparative Example 2

Granules having aromatic substance-including microcapsules adhered to the outer surface of the base material were obtained in the same manner as Example 1, except that impact-disintegrating microcapsules with a silica outer shell were used instead of impact-disintegrating microcapsules with a melamine resin outer shell.

The granules of Examples 1 and 2 and Comparative Examples 1 and 2, obtained as described above, were used for the following aromatic property test, and the aromatic property of the granules (litter) after passing artificial urine through was evaluated. The evaluation results are shown in Table 1 below.

[Aromatic Property Test]

(1) Using a cup-shaped container (diameter: 10 cm, depth: 7 cm) comprising at the bottom section a duckboard with 2.75 mm×23.5 mm rectangular openings and a 2 mm-wide ribs, and having an open area ratio of 25%, granules (litter granules) were spread onto the duckboard to a thickness of 2 cm. When the granules included a super-absorbent material (Comparative Example 1), the granules softened after the artificial urine had been dropped, sometimes falling down from the opening, and therefore the container used was one with a prescribed volume having a flat bottom section, without the aforementioned opening or ribs.

(2) A dropping tool having a tip section with an inner diameter of 2.47 mm and an outer diameter of 5.47 mm was used to drop 20 g of artificial urine onto the granules for 10 seconds, from a position 3 cm above the surface of the spread granules.

The artificial urine was prepared by dissolving 200 g of urea, 80 g of sodium chloride, 8 g of magnesium sulfate, 3 g of calcium chloride and approximately 1 g of dye: Blue #1 in 10 L of ion-exchanged water.

(3) The granules through which the artificial urine had passed (for Comparative Example 1, the granule clumps formed by absorption of artificial urine) were removed out alone in a separate container.

(4) The removed granules (or granule clumps) were stationed for 1 hour each in the separate container and then shaken for 1 minute (to apply impact), and the aromatic substance aroma generated from the granules (or granule clumps) was confirmed.

(5) The strength of the aromatic substance aroma generated from the granules (or granule clumps) (the aromatic property) was organoleptically evaluated based on the following criteria.
VG: Strongly perceptible aromatic substance aroma
G: Weak but perceptible aromatic substance aroma
P: No aromatic substance aroma

TABLE 1

|  |  | Example 1 | Example 2 | Comp. Example 1 | Comp. Example 2 |
|---|---|---|---|---|---|
| Base material composition | Zeolite (mass %) | 69.8 | 69.8 | — | 69.8 |
| | Bentonite (mass %) | — | — | 100 | — |
| | Cement (mass %) | 20 | 20 | — | 20 |
| | C-type silica gel (mass %) | 10 | 10 | — | 10 |
| | Modified cellulose (mass %) | 0.2 | 0.2 | — | 0.2 |
| Initial absorption rate (%) | | 9 | 9 | 100 | 9 |
| Microcapsules | | Melamine | Gelatin | Melamine | Silica |
| Aromatic property evaluation result | | VG | G | P | P |

As shown in Table 1, the granules (litter) of Examples 1 and 2 had perceptible aromatic substance aromas even after passage of artificial urine. The granules of Example 1, in particular, had strongly perceptible aromatic substance aroma, and thus it is assumed that a sufficient amount of non-disintegrated microcapsules were adhering to the outer surface of the base material even after passage of the artificial urine. The granules of Comparative Examples 1 and 2, on the other hand, had no perceptible aromatic substance aroma after passage of artificial urine, even with application of impact. The granules of Comparative Example 1 employed the super-absorbent material bentonite as the raw material for the base material, and therefore it is assumed that when artificial urine was supplied, the microcapsules became incorporated inside the granules together with the artificial urine, or became incorporated in the granule clumps. Also, the granules of Comparative Example 2 employed microcapsules wherein the outer shell was composed of silica that was readily disintegratable by light impact (fragile), and it is therefore assumed that the microcapsules had already disintegrated by transport at the stage prior to the aromatic property test, resulting in no perception of aromatic substance aroma even upon application of impact in the aromatic property test.

REFERENCE SIGN LIST

1 Animal toilet
2 Cover
3 Animal litter
4 Litter housing container
5 Excreta treatment sheet
6 Excreta treatment sheet-housing container
7 Granular base material
8 Microcapsule
81 Small particle size capsule
82 Medium particle size capsule
83 Large particle size capsule

The invention claimed is:
1. Animal litter comprising granules, each of the granules including
a granular base material, and
multiple microcapsules adhering to an outer surface of the base material, wherein
the base material includes a low absorbent material with an initial absorption rate of no greater than 10%, and
each of the multiple microcapsules is an impact-disintegrating microcapsule including an aromatic substance.
2. The animal litter according to claim 1, wherein the low absorbent material is zeolite.
3. The animal litter according to claim 1, wherein each of the multiple microcapsules includes an outer shell made of a melamine resin, and the aromatic substance held inside the outer shell.
4. The animal litter according to claim 1, wherein the multiple microcapsules include microcapsules with particle sizes of 1 to 10 µm in a proportion of 90% or greater.
5. The animal litter according to claim 1, wherein the multiple microcapsules are partially present on the outer surface of the base material.
6. The animal litter according to claim 1, wherein at least some of the multiple microcapsules are accumulated on the outer surface of the base material to form several overlapping layers of the microcapsules on the outer surface of the base material.
7. The animal litter according to claim 1, wherein the multiple microcapsules include different types of microcapsules with different particle sizes.
8. The animal litter according to claim 7, wherein the different types of microcapsules with different particle sizes include
small particle size capsules with particle sizes of 1 to 4 µm at 20 to 50%, and
large particle size capsules with particle sizes of 8 to 10 µm at 3 to 30%.
9. A method of manufacturing animal litter, the method comprising:
a granulation step in which multiple grains of a granular base material are granulated from a raw material that includes at least a low absorbent material with an initial absorption rate of no greater than 10%,
a conveying step in which granulated base material grains are conveyed to a storage tank, and
a packaging step in which granular base material grains that have been conveyed to the storage tank are packaged into fixed quantities,
wherein the packaging step further includes blasting of multiple microcapsules onto the granular base material grains to form the animal litter, the animal litter comprising granules, each of the granules including
the granular base material, and
the multiple microcapsules adhering to an outer surface of the base material,
wherein the base material includes the low absorbent material with the initial absorption rate of no greater than 10%, and
wherein each of the multiple microcapsules is an impact-disintegrating microcapsule including an aromatic substance.

10. The animal litter according to claim 1, wherein each of the multiple microcapsules has the impact-disintegrating microcapsule that includes
- an outer shell made of at least one selected from the group consisting of melamine resin, polyurethane resin, polyuria resin, polyester resin, gelatin, polystyrene resin, polycarbonate resin, and urea-formaldehyde resin, and
- the aromatic substance held inside the outer shell.

11. The animal litter according to claim 1, wherein the low absorbent material has the initial absorption rate of 3% or greater.

12. The animal litter according to claim 1, wherein the outer surface of the base material has
- a first region covered by the multiple microcapsules, and
- a second region exposed from the multiple microcapsules.

13. The animal litter according to claim 8, wherein the different types of microcapsules with the different particle sizes further include medium particle size capsules with particle sizes of 5 to 7 μm at 20 to 77%.

* * * * *